United States Patent
Huang et al.

(10) Patent No.: US 12,000,610 B2
(45) Date of Patent: Jun. 4, 2024

(54) CONTROL METHOD AND CONTROL DEVICE OF APPARATUS AND APPARATUS USING CONTROL DEVICE

(71) Applicant: Gree Electric Appliances, Inc. of Zhuhai, Guangdong (CN)

(72) Inventors: Qiang Huang, Guangdong (CN); Jie Tang, Guangdong (CN); Weiyou Yu, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 378 days.

(21) Appl. No.: 17/281,829

(22) PCT Filed: Dec. 20, 2018

(86) PCT No.: PCT/CN2018/122217
§ 371 (c)(1),
(2) Date: Mar. 31, 2021

(87) PCT Pub. No.: WO2020/069639
PCT Pub. Date: Apr. 9, 2020

(65) Prior Publication Data
US 2022/0026096 A1      Jan. 27, 2022

(30) Foreign Application Priority Data

Oct. 1, 2018  (CN) .......................... 201811163612.7

(51) Int. Cl.
*F24F 11/66* (2018.01)
*F24F 11/46* (2018.01)
*F24F 11/88* (2018.01)

(52) U.S. Cl.
CPC .............. *F24F 11/66* (2018.01); *F24F 11/46* (2018.01); *F24F 11/88* (2018.01)

(58) Field of Classification Search
None
See application file for complete search history.

(56) References Cited

U.S. PATENT DOCUMENTS

| 5,309,728 A | 5/1994 | Chae |
| 9,951,966 B2 | 4/2018 | Sawada et al. |
| 11,162,700 B2 | 11/2021 | Yang et al. |
| 11,320,167 B2 * | 5/2022 | Yan .......................... F24F 11/58 |
| 2007/0251250 A1 * | 11/2007 | Meakawa ................ F24F 11/30 62/126 |

(Continued)

FOREIGN PATENT DOCUMENTS

| CN | 101089497 A | 12/2007 |
| CN | 101165421 A | 4/2008 |
| CN | 203443031 U | 2/2014 |

(Continued)

*Primary Examiner* — Thomas C Lee
*Assistant Examiner* — Anzuman Sharmin
(74) *Attorney, Agent, or Firm* — The Webb Law Firm

(57) ABSTRACT

Disclosed are a control method and a control device of an apparatus and an apparatus using the control device. The control method includes: detecting whether an outdoor unit of the apparatus enters a standby state; and controlling the outdoor unit to enter a low power consumption mode for controlling a drive of the outdoor unit to be powered off after detecting that the outdoor unit enters the standby state.

12 Claims, 3 Drawing Sheets

(56) References Cited

U.S. PATENT DOCUMENTS

2008/0092570 A1    4/2008  Choi

FOREIGN PATENT DOCUMENTS

| | | | | |
|---|---|---|---|---|
| CN | 104896687 A | | 9/2015 | |
| CN | 105027420 A | | 11/2015 | |
| CN | 105135594 A | | 12/2015 | |
| CN | 105302214 A | | 2/2016 | |
| CN | 105757881 A | | 7/2016 | |
| CN | 106247537 A | * | 12/2016 | ............. F24F 11/30 |
| CN | 106247537 A | | 12/2016 | |
| CN | 108119994 A | | 6/2018 | |
| CN | 108168048 A | | 6/2018 | |
| CN | 108488948 A | | 9/2018 | |
| CN | 208888617 U | | 5/2019 | |
| EP | 2955839 A1 | * | 12/2015 | ............. H02P 6/085 |
| EP | 2241831 B1 | | 4/2018 | |
| JP | 2010054065 A | * | 3/2010 | |
| JP | 2019030132 A | * | 2/2019 | |
| KR | 950002921 Y1 | * | 4/1995 | |
| KR | 1020110026308 A | | 3/2011 | |

\* cited by examiner

CONTROL METHOD AND CONTROL DEVICE OF APPARATUS AND APPARATUS USING CONTROL DEVICE

CROSS-REFERENCE TO RELATED APPLICATIONS

This application is the United States national phase of International Application No. PCT/CN2018/122217 filed Dec. 20, 2018, and claims priority to the Chinese Patent Disclosure NO. 201811163612.7 filed on Oct. 1, 2018 and entitled "CONTROL METHOD AND CONTROL DEVICE OF APPARATUS, AND APPARATUS USING THE CONTROL DEVICE", the disclosures of which are hereby incorporated by reference in their entirety.

TECHNICAL FIELD

The present disclosure relates to the technical field of apparatus, and in particular, to a control method and a control device of an apparatus, and an apparatus using the control device.

BACKGROUND

At present, multi-split air conditioners are widely used in commercial places such as shopping malls, gymnasiums, office buildings. The multi-split air conditioner has large capacity, flexible configuration, and is deeply trusted by users, but it also faces the problems of high power consumption, high electric energy consumption and the like. Because in the commercial places, power supplies and switches of indoor units are independent of those of outdoor units, in most cases, when an air conditioner is not used by the user, only the power supply of the indoor unit will be shut off, while the outdoor unit is usually in a standby state instead of being powered off since the outdoor unit is typically installed on a roof and inconvenient to operate. Moreover, a higher standby power of frequency conversion drive will result in a high standby power consumption, and long-time standby will result in waste of electric energy resources and high electricity cost.

As for the problem of high standby power consumption of the outdoor units of the multi-split air conditioners in the related art, an effective solution is not proposed at present yet.

SUMMARY

The present disclosure provides a control method and a control device of an apparatus and an apparatus using the control device, so as to at least solve the problem of high standby power consumption of the outdoor units of the multi-split air conditioners in the related art.

In order to solve the above technical problem, according to an aspect of the embodiments of the present disclosure, there is provided control method of an apparatus, comprising: detecting whether an outdoor unit of the apparatus enters a standby state; and controlling the outdoor unit to enter a low power consumption mode for controlling a drive of the outdoor unit to be powered off after detecting that the outdoor unit enters the standby state.

In one of the embodiments, that detecting whether an outdoor unit of the apparatus enters a standby state comprises: detecting an on/off state of indoor units of the apparatus; wherein the apparatus comprises a plurality of indoor units; and when the plurality of indoor units are all in the off state, the outdoor unit enters the standby state.

In one of the embodiments, that controlling the outdoor unit to enter a low power consumption mode comprises: controlling a power supply load of the outdoor unit to be disconnected; and controlling a power switch of the outdoor unit to be disconnected.

In one of the embodiments, after controlling the power switch of the outdoor unit to be disconnected, the method comprises: detecting whether the power switch of the outdoor unit is disconnected; and controlling a power supply of the drive of the outdoor unit to be disconnected after detecting that the power switch of the outdoor unit is disconnected.

In one of the embodiments, that controlling a power supply of the drive of the outdoor unit to be disconnected comprises: controlling a power switch of the drive to be disconnected; and stopping supplying power to a drive load and a drive MCU power supply source after detecting that the power switch of the drive is disconnected.

In one of the embodiments, after stopping supplying power to the drive MCU power supply source, the method further comprises: triggering the drive MCU power supply source to enter a discharging mode, and continuously supplying power to a drive MCU until discharging is finished; wherein the drive MCU stops working after the discharging of the drive MCU power supply source is finished.

In one of the embodiments, the method further comprises: detecting states of the power switch the outdoor unit and the power switch of the drive; and when at least one of the power switch of the outdoor unit or the power switch of the drive is in an on state, supplying power to the drive load and the drive MCU power supply source.

In one of the embodiments, the apparatus is an air conditioner.

According to another aspect of the embodiments of the present disclosure, there is provided a control device of an apparatus, comprising an outdoor unit detection circuit and a drive circuit; wherein the outdoor unit detection circuit is connected with the drive circuit, and configured to detect whether the outdoor unit enters a standby state and send a detection result to the drive circuit; and the drive circuit is connected with the outdoor unit detection circuit and configured to control the outdoor unit to enter a low power consumption mode under the condition that the detection result is that the outdoor unit enters a standby state; wherein the low power consumption mode is used for controlling a drive of the outdoor unit to be powered off.

In one of the embodiments, the drive circuit comprises: a drive control circuit connected with the outdoor unit detection circuit and configured to receive the detection result of the outdoor unit detection circuit; and a drive power circuit connected with the drive control circuit and the outdoor unit and configured to control the outdoor unit to enter a low power consumption mode when the outdoor unit enters the standby state.

In one of the embodiments, the drive control circuit comprises: a drive MCU connected with the outdoor unit detection circuit and configured to receive the detection result of the outdoor unit detection circuit; a drive switch control circuit connected with the drive MCU and configured to control a drive power switch according to the detection result of the outdoor unit detection circuit; and the drive power switch connected with the drive switch control circuit and the drive power circuit and configured to enter an off state when the outdoor unit enters the standby state.

In one of the embodiments, the outdoor unit detection circuit comprises: an outdoor unit switch control circuit connected with the outdoor unit and the drive MCU and configured to detect whether the outdoor unit enters the standby state and send the detection result to the drive MCU; and an outdoor unit power switch connected with the outdoor unit switch control circuit and the drive power circuit and configured to enter an off state when the outdoor unit enters the standby state.

In one of the embodiments, the drive power circuit is specifically configured to: control a power supply of the drive of the outdoor unit to be disconnected when both the drive power switch and the outdoor unit power switch are in an off state.

In one of the embodiments, the drive power circuit comprises: a drive power control circuit, at one end, connected with commercial power, and at the other end, connected with the drive power switch and the outdoor unit power switch, and configured to be disconnected from the commercial power when both the drive power switch and the outdoor unit power switch are in an off state; a drive charging circuit, at one end, connected with the drive power control circuit, and at the other end, connected with a drive MCU power supply source and a drive load, and configured to stop supplying power to the drive load and a drive MCU power supply source when the drive power control circuit is disconnected from the commercial power; and the drive MCU power supply source, at one end, connected with the drive charging circuit, and at the other end, connected with the drive MCU, and configured to supply power to the drive MCU.

In one of the embodiments, after the drive charging circuit stops supplying power to the drive MCU power supply source, the drive MCU power supply source is further configured to: enter a discharging mode, and continuously supply power to the drive MCU until discharging is finished; wherein the drive MCU stops working after the discharging is finished.

In one of the embodiments, the drive power control circuit is further configured to be connected with the commercial power when at least one of the drive power switch or the outdoor unit power switch is in an on state; and the drive charging circuit is further configured to supply power to the drive load and the MCU power supply source when the drive power control circuit is connected with the commercial power.

In one of the embodiments, the MCU power supply source is charged and discharged by using a capacitor.

In one of the embodiments, the apparatus comprises a plurality of indoor units; and the outdoor unit detection circuit is specifically configured to: determine whether the outdoor unit enters the standby state by detecting whether the plurality of indoor units are all in an off state; wherein when the plurality of indoor units are all in the off state, the outdoor unit is determined to enter the standby state.

According to a further aspect of the embodiments of the present disclosure, there is provided an apparatus comprising a control device of the apparatus as described above.

According to a further aspect of the embodiments of the present disclosure, there is provided a computer comprising a memory, a processor and a computer program stored on the memory and executable on the processor, wherein the apparatus control method as described above is implemented when the program is executed by the processor.

According to a further aspect of the embodiments of the present disclosure, there is provided a storage medium embodying computer-executable instructions, wherein the computer-executable instructions, when executed by a computer processor, performs the apparatus control method as described above.

In this disclosure, in order to reduce power consumption of the drive when the outdoor unit of the air conditioner is standby, by detecting whether the outdoor unit of the apparatus enters a standby state, and after detecting that the outdoor unit enters the standby state, controlling the outdoor unit to enter a low power consumption mode, the drive of the outdoor unit is controlled to be powered off, which solves the problem that standby power consumption of the outdoor units of the multi-split air conditioners is high in the related art, greatly reduces the power consumption, saves the electricity cost, and moreover, since the low power consumption mode enables the drive load to be automatically powered off, service life and utilization rate of the unit are improved.

DETAILED DESCRIPTION

Now, the exemplary embodiments will be described in detail, examples of which are illustrated in the accompanying drawings. When the following description refers to the accompanying drawings, unless otherwise indicated, identical numbers in different drawings represent identical or similar elements. The implementations described in the following exemplary embodiments do not represent all implementations consistent with the present disclosure. Instead, they are merely examples of apparatuses and methods consistent with certain aspects of the present disclosure as detailed in the appended claims.

Embodiment 1

Figure 1:
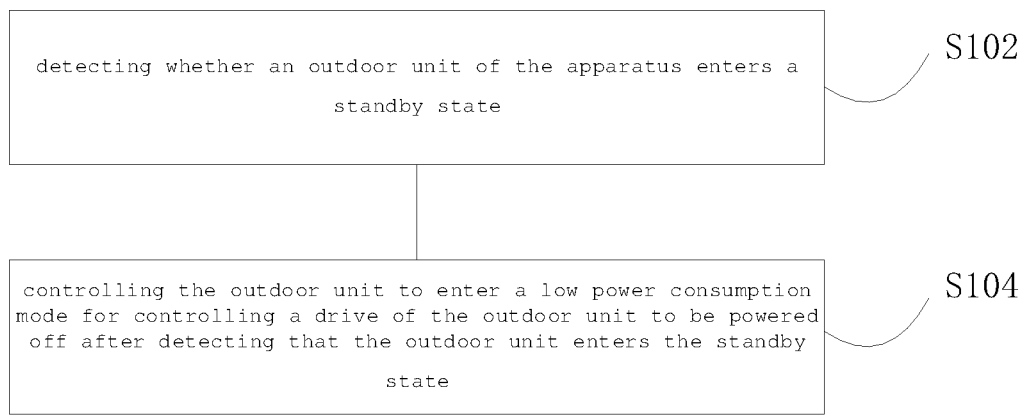
FIG. 1 is an optional flow diagram of an apparatus control method according to the embodiments of the present disclosure.

In Embodiment 1 of the present disclosure, there is provided an apparatus control method, wherein the control method can be directly applied to various apparatuses such as air conditioners, and in a specific implementation, it can be implemented by installing a software, an APP, or writing a corresponding program in the apparatus. Specifically, FIG. 1 shows an optional flow diagram of the method, and as shown in FIG. 1, the method comprises the following steps of:

S102, detecting whether an outdoor unit of the apparatus enters a standby state; and S104, controlling the outdoor unit to enter a low power consumption mode after detecting that the outdoor unit enters the standby state; wherein the low power consumption mode is used for controlling a drive of the outdoor unit to be powered off.

In the above implementation, in order to reduce power consumption of the drive when the outdoor unit of the air conditioner is standby, by detecting whether the outdoor unit of the apparatus enters a standby state, and after detecting that the outdoor unit enters the standby state, controlling the outdoor unit to enter a low power consumption mode, the drive of the outdoor unit is controlled to be powered off, which solves the problem that standby power consumption of the outdoor unit of the multi-split air conditioner is high in the related art, greatly reduces the power consumption, saves the electricity cost, and moreover, since the low power consumption enables the drive load to be automatically powered off, service life and utilization rate of the unit are improved.

In the above implementation, detecting whether an outdoor unit of the apparatus enters a standby state comprises: detecting an on/off state of indoor units of the apparatus; wherein the apparatus comprises a plurality of indoor units; when the plurality of indoor units are all in an off state, the outdoor unit enters the standby state.

Optionally, controlling the outdoor unit to enter a low power consumption mode comprises: controlling a power supply load of the outdoor unit to be disconnected; and controlling a power switch of the outdoor unit to be disconnected. The power supply load is a load of the outdoor unit, such as a fan and a compressor. Herein, after the power switch of the outdoor unit is controlled to be disconnected, the above method comprises: detecting whether the power switch of the outdoor unit is disconnected; and after detecting that the power switch of the outdoor unit is disconnected, controlling a power supply of the drive of the outdoor unit to be disconnected. Further, controlling a power supply of the drive of the outdoor unit to be disconnected comprises: controlling a power switch of the drive to be disconnected; and after detecting that the power switch of the drive is disconnected, stopping supplying power to the drive load and a drive MCU power supply source. The drive load is a load of the drive, for example, a drive inverter.

In an implementation of the present disclosure, after stopping supplying power to the drive MCU power supply source, the method further comprises: triggering the drive MCU power supply source to enter a discharging mode, and continuously supplying power to the drive MCU until discharging is finished; wherein the drive MCU stops working after the discharging of the drive MCU power supply source is finished.

In another implementation of the present disclosure, states of the power switch of the outdoor unit and the power switch of the drive are detected; and when at least one of the power switch of the outdoor unit or the power switch of the drive is in an on state, power is supplied to the drive load and the drive MCU power supply source.

Further, the apparatus is an air conditioner.

Figure 2:
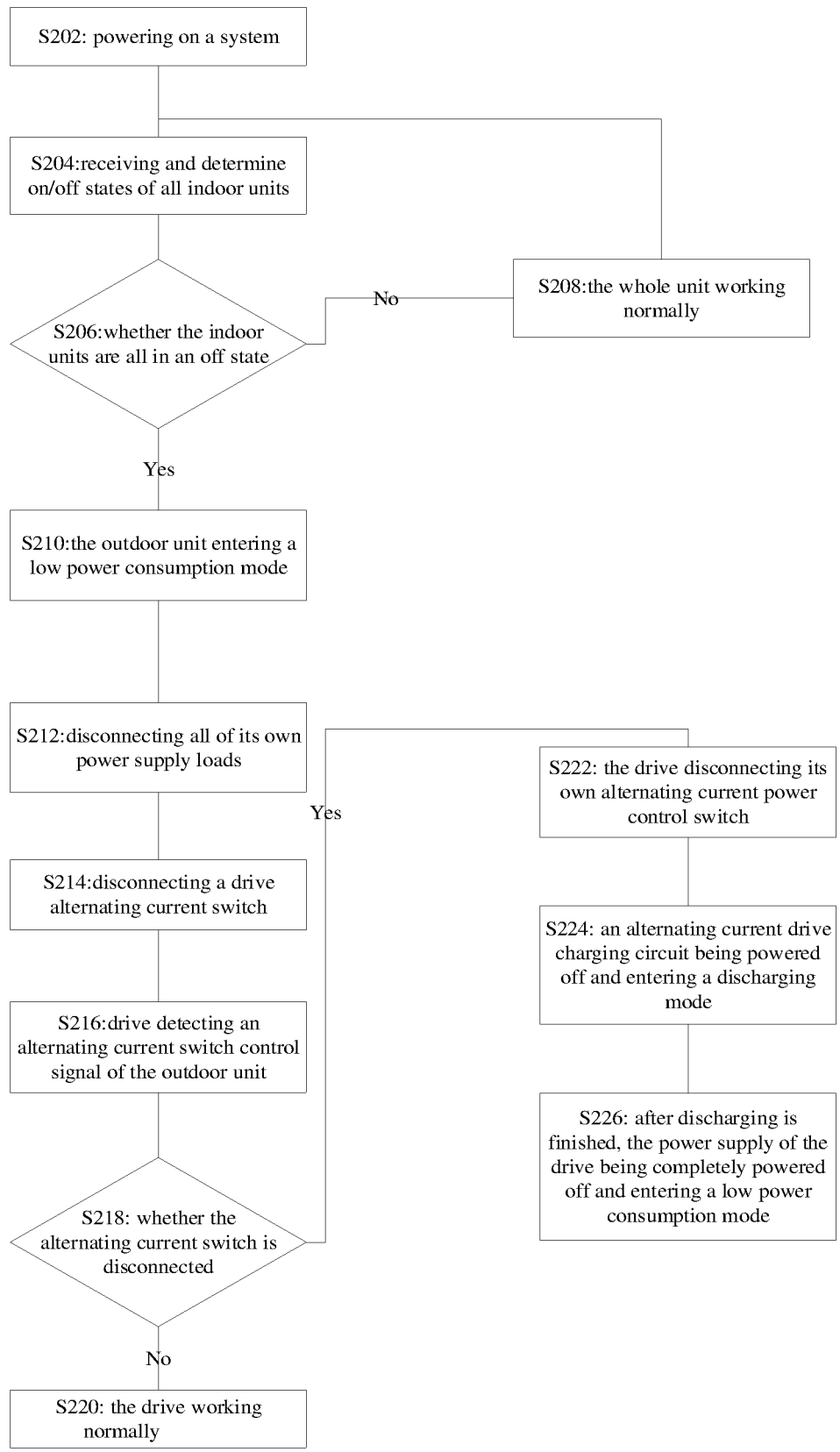
FIG. 2 is another optional flow diagram of an apparatus control method according to the embodiments of the present disclosure.

In Embodiment 1 of the present disclosure, there is provided another apparatus control method, and specifically, FIG. 2 shows an optional flow diagram of the method, and as shown in FIG. 2, the method comprises the following steps of:

S202, powering on a system;
S204, receiving and judging an on/off state of all indoor units;
S206, detecting whether the indoor units are all in an off state, if so, going to S210, otherwise, going to S208;
S208, the whole unit working normally, and then going to S204;
S210, the outdoor unit entering a low power consumption mode;
S212, disconnecting all of its own power supply loads;
S214, disconnecting a drive alternating current switch;
S216, a drive detecting an alternating current switch control signal of the outdoor unit;
S218, detecting whether the alternating current switch is disconnected, if so, going to S222, otherwise, going to S220;
S220, the drive working normally;
S222, the drive disconnecting its own alternating current power control switch;
S224, an alternating current drive charging circuit being powered off and entering a discharging mode; and
S226, after discharging is finished, the power supply of the drive being completely powered off and entering a low power consumption mode.

In the above implementation, in order to reduce power consumption of the drive when the outdoor unit of the air conditioner is standby, by detecting whether the outdoor unit of the apparatus enters a standby state, and after detecting that the outdoor unit enters the standby state, controlling the outdoor unit to enter a low power consumption mode, the drive of the outdoor unit is controlled to be powered off, which solves the problem that standby power consumption of the outdoor unit of the multi-split air conditioner is high in the related art, greatly reduces the power consumption, saves the electricity cost, and moreover, since the low power consumption enables the drive load to be automatically powered off, service life and utilization rate of the unit are improved.

Embodiment 2

Figure 3:
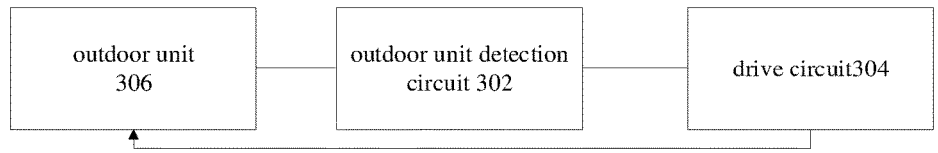
FIG. 3 is an optional structural block diagram of an apparatus control device according to the embodiments of the present disclosure.

Based on the apparatus control method provided in Embodiment 1, in Embodiment 2 of the present disclosure, there is further provided an apparatus control device, and specifically, FIG. 3 shows an optional structural block diagram of the device, and as shown in FIG. 3, the device comprises:

an outdoor unit detection circuit 302 and a drive circuit 304;
the outdoor unit detection circuit 302, at one end, connected with an outdoor unit 306 of the apparatus, and at the other end, connected with the drive circuit 304, and configured to detect whether the outdoor unit enters a standby state and send a detection result to the drive circuit; and
the drive circuit 304, at one end, connected with the outdoor unit detection circuit 302, and at the other end, connected with the outdoor unit 306, and configured to control the outdoor unit to enter a low power consumption mode when the detection result is that the outdoor unit enters the standby state; wherein the low power consumption mode is used for controlling a drive of the outdoor unit to be powered off.

In the above implementation, in order to reduce power consumption of the drive when the outdoor unit of the air conditioner is standby, by detecting whether the outdoor unit of the apparatus enters a standby state, and after detecting that the outdoor unit enters the standby state, controlling the outdoor unit to enter a low power consumption mode, the drive of the outdoor unit is controlled to be powered off, which solves the problem that standby power consumption of the outdoor unit of the multi-split air conditioner is high in the related art, greatly reduces the power consumption, saves the electricity cost, and moreover, since the low power consumption enables the drive load to be automatically powered off, service life and utilization rate of the unit are improved.

Figure 4:
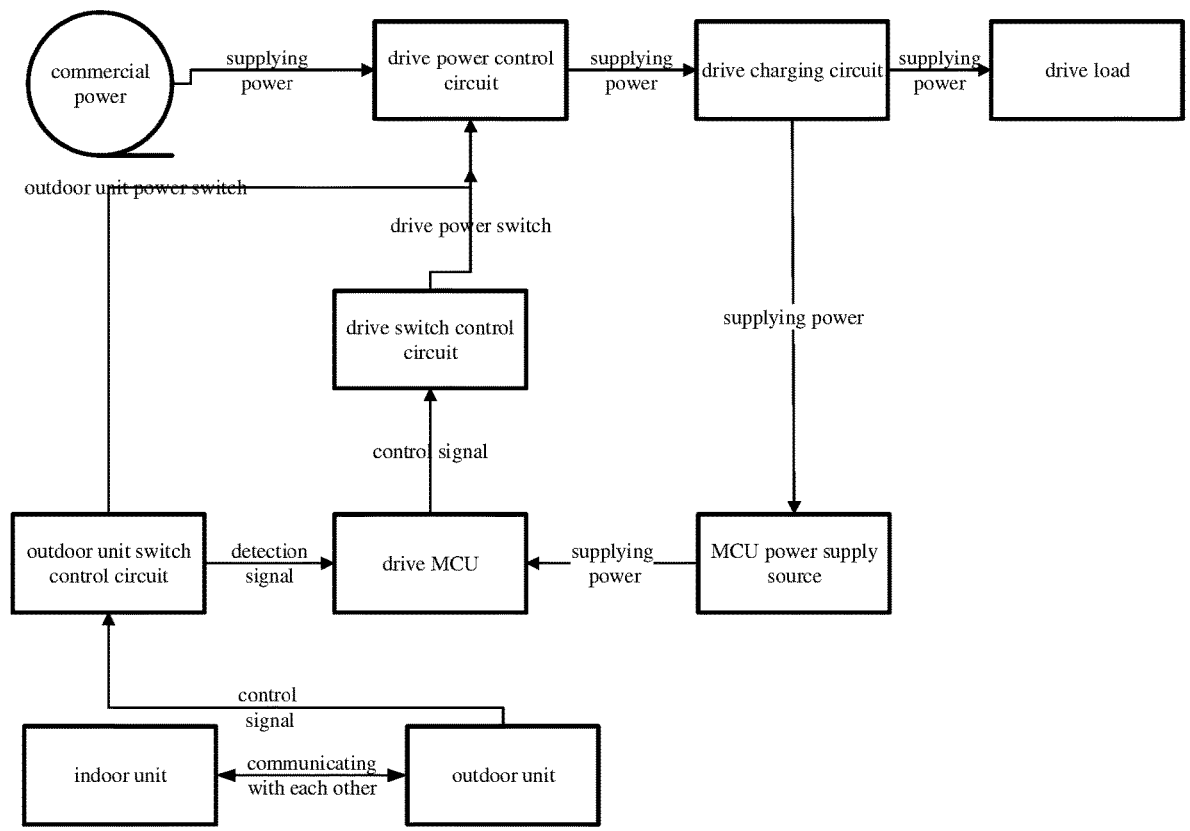
FIG. 4 is another optional structural block diagram of an apparatus control device according to the embodiments of the present disclosure.

In Embodiment 2 of the present disclosure, there is further provided an apparatus control device, and specifically, FIG. 4 shows an optional structural block diagram of the device, and as shown in FIG. 4, a drive circuit comprises: a drive control circuit, connected with the outdoor unit detection circuit and configured to receive the detection result of the outdoor unit detection circuit; and a drive power circuit, connected with the drive control circuit and the outdoor unit and configured to control the outdoor unit to enter the low power consumption mode when the outdoor unit enters the standby state.

Optionally, the drive control circuit comprises: a drive MCU, connected with the outdoor unit detection circuit and configured to receive the detection result of the outdoor unit detection circuit; a drive switch control circuit, connected with the drive MCU and configured to control a drive power switch according to the detection result of the outdoor unit detection circuit; and the drive power switch, connected with the drive switch control circuit and the drive power circuit and configured to enter an off state when the outdoor unit enters the standby state.

Further, the outdoor unit detection circuit comprises: an outdoor unit switch control circuit, connected with the outdoor unit and the drive MCU, and configured to detect whether the outdoor unit enters the standby state and send the detection result to the drive MCU; and an outdoor unit power switch, connected with the outdoor unit switch control circuit and the drive power circuit, and configured to enter an off state when the outdoor unit enters the standby state.

When the outdoor unit enters the low power consumption mode, it shuts down all of its own power supply loads, and sends a switch-off control signal to the outdoor unit switch control circuit. Then, the outdoor unit power switch is off, and the frequency conversion drive MCU synchronously detects the control signal of the outdoor unit switch. If the switch is not off, the drive works normally. If the switch is off, the drive MCU sends the switch-off signal to the drive switch control circuit, and then, the drive power switch is off.

In an implementation of the present disclosure, the drive power circuit is specifically configured to: when both the drive power switch and the outdoor unit power switch are in an off state, control a power supply of the drive of the outdoor unit to be disconnected.

Herein, the drive power circuit comprises: a drive power control circuit, at one end, connected with commercial power, and at the other end, connected with the drive power switch and the outdoor unit power switch, and configured to be disconnected from the commercial power when both the drive power switch and the outdoor unit power switch are in an off state; a drive charging circuit, at one end, connected with the drive power control circuit, and at the other end, connected with the drive MCU power supply source and a drive load, and configured to stop supplying power to the drive load and the drive MCU power supply source when the drive power control circuit is disconnected from the commercial power; and the drive MCU power supply source, at one end, connected with the drive charging circuit, and at the other end, connected with the drive MCU, and configured to supply power to the drive MCU.

Further, after the drive charging circuit stops supplying power to the drive MCU power supply source, the drive MCU power supply source is further configured to: enter a discharging mode, and continuously supply power to the drive MCU until discharging is finished; wherein the drive MCU stops working after the discharging is finished.

When the drive control circuit detects that the drive power switch and the outdoor unit power switch are simultaneously disconnected, the drive charging circuit is disconnected, then the drive load is powered off, the drive MCU power supply source is powered off and enters a discharging mode to continuously supply power to the drive MCU until discharging is finished, then the drive load and the MCU is completely in a power-off state, and the system enters the low power consumption state.

In another implementation of the present disclosure, the drive power control circuit is further configured to: when at least one of the drive power switch or the outdoor unit power switch is in an on state, be connected with the commercial power; and the drive charging circuit is further configured to: when the drive power control circuit is connected with the commercial power, supply power to the drive load and the MCU power supply source.

Optionally, the MCU power supply source is charged and discharged by using a capacitor.

The drive power control circuit is powered by means of the commercial power and controls the drive load and the MCU to be powered by means of the switch. When the drive control circuit detects that either of the drive power switch and the outdoor unit power switch is on, the drive charging circuit starts supplying power to the drive load and the MCU, and the drive MCU power supply source starts charging.

When the outdoor unit receives a power on command of any indoor unit, the outdoor unit is awakened, all the loads of the outdoor unit work again, and a switch-on signal is sent to the outdoor unit switch control circuit, then the drive power control circuit works normally, the drive charging circuit is turned on, so that the drive is awakened to work normally again. This cycle repeats as described above.

In yet another implementation of the present disclosure, the apparatus comprises a plurality of indoor units; the outdoor unit detection circuit is specifically configured to: determine whether the outdoor unit enters the standby state by detecting whether the plurality of indoor units are all in an off state; wherein when the plurality of indoor units are all in an off state, the outdoor unit is determined to enter the standby state. The whole unit is powered on, and the outdoor unit receives on-off control signals of all the indoor units.

It is judged whether the indoor units are all in an off state, if they are all in an off state, the outdoor unit enters a low power consumption mode, and if not, it works normally.

With regard to the device in the above embodiment, the specific implementations of each unit and module thereof have been described in detail in the embodiments related to the method, and will not be elaborated here.

Embodiment 3

Based on the device provided in the above Embodiment 2, in Embodiment 3 of the present disclosure, there is further provided an apparatus comprising the apparatus control device as described in the above embodiment.

In the above implementation, in order to reduce power consumption of the drive when the outdoor unit of the air conditioner is standby, by detecting whether the outdoor unit of the apparatus enters a standby state, and after detecting that the outdoor unit enters the standby state, controlling the outdoor unit to enter a low power consumption mode, the drive of the outdoor unit is controlled to be powered off, which solves the problem that standby power consumption of the outdoor unit of the multi-split air conditioner is high in the related art, greatly reduces the power consumption, saves the electricity cost, and moreover, since the low power consumption enables the drive load to be automatically powered off, service life and utilization rate of the unit are improved.

Embodiment 4

Based on the method provided in the above Embodiment 1, in Embodiment 4 of the present disclosure, there is further provided a computer comprising a memory, a processor, and a computer program stored on the memory and executable on the processor, wherein the apparatus control method as described above is implemented when the program is executed by the processor.

In the above implementation, in order to reduce power consumption of the drive when the outdoor unit of the air conditioner is standby, by detecting whether the outdoor unit of the apparatus enters a standby state, and after detecting that the outdoor unit enters the standby state, controlling the outdoor unit to enter a low power consumption mode, the drive of the outdoor unit is controlled to be powered off, which solves the problem that standby power consumption of the outdoor unit of the multi-split air conditioner is high in the related art, greatly reduces the power consumption, saves the electricity cost, and moreover, since the low power consumption enables the drive load to be automatically powered off, service life and utilization rate of the unit are improved.

Embodiment 5

Based on the method provided in the above Embodiment 1, in Embodiment 5 of the present disclosure, there is further provided a storage medium embodying computer-executable instructions, wherein the computer-executable instructions, when executed by a computer processor, perform the apparatus control method as described above.

In the above implementation, in order to reduce power consumption of the drive when the outdoor unit of the air conditioner is standby, by detecting whether the outdoor unit of the apparatus enters a standby state, and after detecting that the outdoor unit enters the standby state, controlling the outdoor unit to enter a low power consumption mode, the drive of the outdoor unit is controlled to be powered off, which solves the problem that standby power consumption of the outdoor unit of the multi-split air conditioner is high in the related art, greatly reduces the power consumption, saves the electricity cost, and moreover, since the low power consumption enables the drive load to be automatically powered off, service life and utilization rate of the unit are improved.

Other implementations of the present disclosure will be apparent to those skilled in the art from consideration of the specification and practice of the invention disclosed herein. The present disclosure is intended to cover any variation, use, or adaptive change of this disclosure, which follows the general principles of this disclosure and includes common knowledge or customary technical means not invented by this disclosure but within the technical field of this disclosure. It is intended that the specification and embodiments be considered as exemplary only, with a true scope and spirit of the present disclosure being indicated by the following claims.

It will be understood that the present disclosure is not limited to the precise arrangements that have been described above and shown in the drawings, and that various modifications and changes can be made without departing from the scope thereof. The scope of the present disclosure is limited only by the appended claims.

What is claimed is:

1. A control method of an apparatus, comprising:
   detecting whether an outdoor unit of the apparatus enters a standby state;
   controlling the outdoor unit to enter a low power consumption mode for controlling a drive of the outdoor unit to be powered off after detecting that the outdoor unit enters the standby state, wherein the controlling the outdoor unit to enter a low power consumption mode comprises:
   controlling a power supply load of the outdoor unit to be disconnected;
   controlling a power switch of the outdoor unit to be disconnected;
   the control method further comprises:
      detecting whether the power switch of the outdoor unit is disconnected after controlling the power switch of the outdoor unit to be disconnected; and
      controlling a power supply of the drive of the outdoor unit to be disconnected after detecting that the power switch of the outdoor unit is disconnected, comprising controlling a power switch of the drive to be disconnected and stopping supplying power to a drive load and a drive MCU power supply source after detecting that the power switch of the drive is disconnected; and
   detecting states of the power switch of the outdoor unit and the power switch of the drive; and
   when at least one of the power switch of the outdoor unit or the power switch of the drive is in an on state, supplying power to the outdoor unit, the drive load and the drive MCU power supply source, to control the outdoor unit to enter a normal working mode.

2. The control method of an apparatus according to claim 1, wherein: the apparatus comprises one or more indoor units, and the detecting whether an outdoor unit of the apparatus enters a standby state comprises:
   detecting on/off state of indoor units of the apparatus; and
   if all the indoor units are in the off state, detecting that the outdoor unit enters the standby state.

3. The control method of an apparatus according to claim 1, wherein after stopping supplying power to the drive MCU power supply source, the control method further comprises:
   triggering the drive MCU power supply source to enter a discharging mode, and continuously supplying power to the drive MCU until discharging is finished, wherein the drive MCU stops working after the discharging of the drive MCU power supply source is finished.

4. A computer, comprising a memory, a processor and a computer program stored on the memory and executable on the processor, wherein the control method of an apparatus according to claim 1 is implemented when the computer program is executed by the processor.

5. A non-transitory storage medium embodying computer-executable instructions, wherein the computer-executable instructions, when executed by a computer processor, perform the control method of an apparatus according to claim 1.

6. A control device of an apparatus, comprising an outdoor unit detection circuit and a drive circuit, wherein:
   the outdoor unit detection circuit is connected with the drive circuit, and configured to detect whether an outdoor unit enters a standby state and send a detection result to the drive circuit, and the outdoor unit detection circuit comprises: an outdoor unit switch control circuit connected with the outdoor unit and a drive MCU and configured to detect whether the outdoor unit enters the standby state and send the detection result to the drive MCU; and an outdoor unit power switch connected with the outdoor unit switch control circuit and a drive power circuit and configured to enter an off state when the outdoor unit enters the standby state; and the drive circuit is connected with the outdoor unit detection circuit and configured to control the outdoor unit to enter a low power consumption mode for controlling a drive of the outdoor unit to be powered off under a condition that the detection result is that the outdoor unit enters a standby state, and the drive circuit comprises:

a drive control circuit connected with the outdoor unit detection circuit and configured to receive the detection result of the outdoor unit detection circuit, the drive control circuit comprises:

the drive MCU connected with the outdoor unit detection circuit and configured to receive the detection result of the outdoor unit detection circuit;

a drive switch control circuit connected with the drive MCU and configured to control the drive power switch according to the detection result of the outdoor unit detection circuit; and the drive power switch connected with the drive switch control circuit and the drive power circuit and configured to enter an off state when the outdoor unit enters the standby state; and the drive power circuit connected with the drive control circuit and the outdoor unit and configured to control the outdoor unit to enter a low power consumption mode when the outdoor unit enters the standby state, wherein the drive power circuit is specifically configured to control a power supply of the drive of the outdoor unit to be disconnected when both the drive power switch and the outdoor unit power switch are in off state.

7. The control device of an apparatus according to claim 6, wherein the drive power circuit comprises:

a drive power control circuit, at one end, connected with commercial power, and at the other end, connected with the drive power switch and the outdoor unit power switch, and configured to be disconnected from the commercial power when both the drive power switch and the outdoor unit power switch are in off state;

a drive charging circuit, at one end, connected with the drive power control circuit, and at the other end, connected with a drive MCU power supply source and a drive load, and configured to stop supplying power to the drive load and the drive MCU power supply source when the drive power control circuit is disconnected from the commercial power; and the drive MCU power supply source, at one end, connected with the drive charging circuit, and at the other end, connected with the drive MCU, and configured to supply power to the drive MCU.

8. The control device of an apparatus according to claim 7, wherein after the drive charging circuit stops supplying power to the drive MCU power supply source, the drive MCU power supply source is further configured to enter a discharging mode, and continuously supply power to the drive MCU until discharging is finished, wherein the drive MCU stops working after the discharging is finished.

9. The control device of an apparatus according to claim 8, wherein:

the drive power control circuit is further configured to be connected with the commercial power when at least one of the drive power switch or the outdoor unit power switch is in on state; and the drive charging circuit is further configured to supply power to the drive load and the drive MCU power supply source when the drive power control circuit is connected with the commercial power.

10. The control device of an apparatus according to claim 8, wherein the drive MCU power supply source is charged and discharged by using a capacitor.

11. The control device of an apparatus according to claim 6, comprising a plurality of indoor units, wherein:

the outdoor unit detection circuit is specifically configured to determine whether the outdoor unit enters the standby state by detecting whether the plurality of indoor units are all in the off state; and when the plurality of indoor units are all in the off state, the outdoor unit is determined to enter the standby state.

12. An apparatus, comprising the control device of the apparatus according to claim 6, wherein the apparatus comprises an air conditioner.

* * * * *